(12) United States Patent
Dunstan et al.

(10) Patent No.: US 9,159,038 B2
(45) Date of Patent: Oct. 13, 2015

(54) PRE-PAID SERVICE SYSTEM AND METHOD

(75) Inventors: Adam Dunstan, Watertown, MA (US); Christopher W. Gunner, Harvard, MA (US); Thomas Martinson, Framingham, MA (US)

(73) Assignee: ACTIVE BROADBAND NETWORKS, INC., Framingham, MA (US)

( * ) Notice: Subject to any disclaimer, the term of this patent is extended or adjusted under 35 U.S.C. 154(b) by 204 days.

(21) Appl. No.: 13/273,806

(22) Filed: Oct. 14, 2011

(65) Prior Publication Data

US 2012/0095858 A1    Apr. 19, 2012

Related U.S. Application Data

(60) Provisional application No. 61/393,130, filed on Oct. 14, 2010.

(51) Int. Cl.
*G06Q 30/00* (2012.01)
*G06F 17/30* (2006.01)
*G06Q 10/00* (2012.01)
*G06Q 30/06* (2012.01)

(52) U.S. Cl.
CPC .............. *G06Q 10/00* (2013.01); *G06Q 30/06* (2013.01); *G06Q 30/0601* (2013.01)

(58) Field of Classification Search
CPC .................................. G06Q 30/0601
USPC ............................... 705/26.1–27.2
See application file for complete search history.

(56) References Cited

U.S. PATENT DOCUMENTS

| | | | |
|---|---|---|---|
| 2006/0143098 A1* | 6/2006 | Lazaridis | 705/34 |
| 2008/0057957 A1* | 3/2008 | Altbaum et al. | 455/435.1 |
| 2010/0169475 A1* | 7/2010 | Woundy et al. | 709/224 |
| 2010/0257584 A1* | 10/2010 | Meenan et al. | 726/1 |
| 2010/0312892 A1* | 12/2010 | Woundy et al. | 709/226 |
| 2011/0151836 A1* | 6/2011 | Dadu et al. | 455/411 |
| 2011/0222549 A1* | 9/2011 | Connelly et al. | 370/401 |
| 2011/0314086 A1* | 12/2011 | Finkelstein et al. | 709/203 |

OTHER PUBLICATIONS

Juniper networks delivers new capabilities to secure and assure broadband cable services; new features enable cable MSOs to enhance multimedia services. (Apr. 4, 2005). Business Wire Retrieved from http://search.proquest.com/docview/445445761?accountid=14753.*

* cited by examiner

*Primary Examiner* — Kathleen Palavecino
(74) *Attorney, Agent, or Firm* — Seyfarth Shaw LLP

(57) ABSTRACT

A pre-paid service system configured to provide a subscriber interface to a Subscriber and receive a service level selection from the subscriber, wherein the service level selection includes a capacity limit and/or a time limit. Upon authorization of a payment, the system activates the Subscriber's service. The system also monitors the Subscriber's usage data and time of activation. When the Subscriber's usage data amount or time of activation meets or exceeds the selected service level, the system may deactivate the Subscriber's service.

9 Claims, 3 Drawing Sheets

PRE-PAID SERVICE SYSTEM AND METHOD

CROSS REFERENCES TO RELATED APPLICATIONS

This application claims the benefit of U.S. Provisional Patent Application Ser. No. 61/393,130, filed on Oct. 14, 2010, the contents of which are incorporated herein by reference in their entirety.

FIELD

The systems and methods disclosed herein relate generally to service payment systems, and more particularly to service payment systems for communication and media services and products.

BACKGROUND

Cable Operators ("Operators") that provide communication and media services and products to Subscribers using a subscription payment model generally enter into contracts with Subscribers in which the Subscribers agree to pay for the services in arrears every month. This subscription payment model requires the Operators to maintain a significant billing system infrastructure to handle Subscriber billing and accounting.

Potential revenue may be lost by Cable Operators due to shortcomings of the typical subscription payment arrangement. For example, many potential new Subscribers do not pass the Operator's credit checking process so the Operator may lose any potential revenue from these Subscribers. Additional revenue is lost when established Subscribers default on their payments for the service already provided. Operators also lose potential revenue when they are unable to make service agreements with potential Subscribers who are not permanent residents at a location, such as hotel rooms or vacation rental properties.

SUMMARY

In an illustrative embodiment, the systems and methods disclosed herein provide a pre-paid service (PPS) payment and activation system and method. In an illustrative embodiment, the PPS system (PPSS) allows a Subscriber, such as an end-user of a communication and media service and/or product, to pay for a service in advance through an on-line transaction using an on-line payment transaction system. The PPS system and method overcomes the drawbacks of the subscription payment model, described above, since the service is only provided after it has been paid for.

In an illustrative embodiment, the PPSS includes a PPSS sub-system and an Internet Protocol Detail Record (IPDR) collector or controller. The PPSS sub-system is configured to provide administrator and subscriber interfaces to the PPSS. In an illustrative embodiment, the PPSS sub-system includes a subscriber user interface (UI) component and an administrator (Admin.) or operator UI component. The Admin. UI component is configured to provide an operator management interface or administrator interface configured to control the PPSS, and the subscriber UI component is configured to provide a subscriber interface which provides a control interface for the Subscribers. For example, the subscriber UI component allows the Subscriber to choose a service level, enter payment information, make on-line payment transactions, and perform other similar functions. The subscriber UI component also interacts with the IPDR controller to activate and/or deactivate service. The PPSS sub-system may also include a payment component configured to interact with on-line payment processing systems such as, but not limited to, credit and/or debit card processing systems to effect a payment for the service.

In an illustrative embodiment, the IPDR controller includes a control component, a policy component, a Packet Cable Multi-Media (PCMM) component, a statistics component, and/or an IPDR component. In an illustrative embodiment, the subscriber UI component provides a subscriber interface, which allows the Subscriber to select a service level or service type. In response to the Subscriber selecting the service level, the subscriber UI component requests the payment component to process a payment. If the payment is authorized, the subscriber UI component requests to the control component in the IPDR controller to provide service to the Subscriber's modem. Upon receiving the request to activate the service level for the Subscriber's modem, the control component requests the policy component to make the activation. Upon receiving the request, the policy component in turn may request the PCMM component to set one or more gates, for example, at least one for each direction, which activates the service. If the service activation has succeeded the subscriber UI component requests the payment component to commit the transaction for the payment. However, if the service activation fails the subscriber UI component requests the payment component to cancel the previously authorized payment transaction.

In an illustrative embodiment, a purchased service level may define a time limit and/or a capacity limit for one or both of downstream and upstream directions. Generally, the IPDR component receives IPDR data from one or more routers, for example Cable Modem Termination Systems (CMTS). Upon receiving the IPDR data, the IPDR component passes the IPDR data to the statistics component, which calculates accumulated usage data for each modem.

The policy component communicates with the statistics component and checks the accumulated statistics calculated by the statistics component to determine whether a Subscriber or the Subscriber's modem has met or exceeded the capacity limit for the service activation in one or both of the downstream and upstream directions. It should be appreciated by one skilled in the art that this check may only be performed if the activated service level specified a capacity limit. If the activated service level specified a capacity limit and the policy component determines that a Subscriber or the Subscriber's modem has met or exceeded the service level capacity limit for an activated service, the policy component requests the PCMM component to deactivate that service.

If the activated service level specified at least a time limit, the policy component determines when the Subscriber or the Subscriber's modem has met or exceeded the service level time limit. When the policy component determines that a Subscriber or the Subscriber's modem has met or exceeded the service level time limit for an activated service, the policy component requests the PCMM component to deactivate the service for the Subscriber's modem.

BRIEF DESCRIPTION OF THE DRAWINGS

The system and methods disclosed herein are illustrated in the figures of the accompanying drawings which are meant to be exemplary and not limiting, in which like references are intended to refer to like or corresponding parts, and in which.

DETAILED DESCRIPTION

Detailed embodiments of service payment and activation systems, methods, and apparatuses are disclosed herein, however, it is to be understood that the disclosed embodiments are merely exemplary of the systems, methods, and apparatuses, which may be embodied in various forms. Therefore, specific functional details disclosed herein are not to be interpreted as limiting, but merely as a basis for the claims and as a representative basis for teaching one skilled in the art to variously employ the systems, methods, and apparatuses disclosed herein.

Generally, the systems, methods, and apparatuses disclosed herein include and may be implemented within a computer, computer system, and/or network of computer systems having one or more databases and other storage apparatuses, servers, and additional components, such as processors or microprocessors, modems, routers, terminals and displays, non-transitory computer-readable media, algorithms, software, modules, platforms, and other computer-related components. The computer systems are especially configured and adapted to perform the functions and processes of the systems, methods, and apparatuses as disclosed herein. The functions and processes of the systems, methods, and apparatuses as disclosed herein may include one or more applications, web-based applications or platforms such as Software-as-a-Service (SaaS), or other types of applications or platforms, and may include one or more user interfaces (UIs) accessible over a network such as the World Wide Web (W3) and/or the Internet and other types of networks including communications networks, cable or content delivery networks, Local area networks (LANs), Metropolitan area networks (MANs), Campus area networks (CANs), Wide area networks (WANs), wireless networks, and other networks of the type.

Communications between various components in the systems, methods, and apparatuses disclosed herein may be unidirectional and/or bidirectional electronic communication through a wired or wireless network. For example, one component may be networked directly, indirectly, through a third party intermediary, wirelessly, or otherwise with other components to enable communication between the components.

Figure 1:
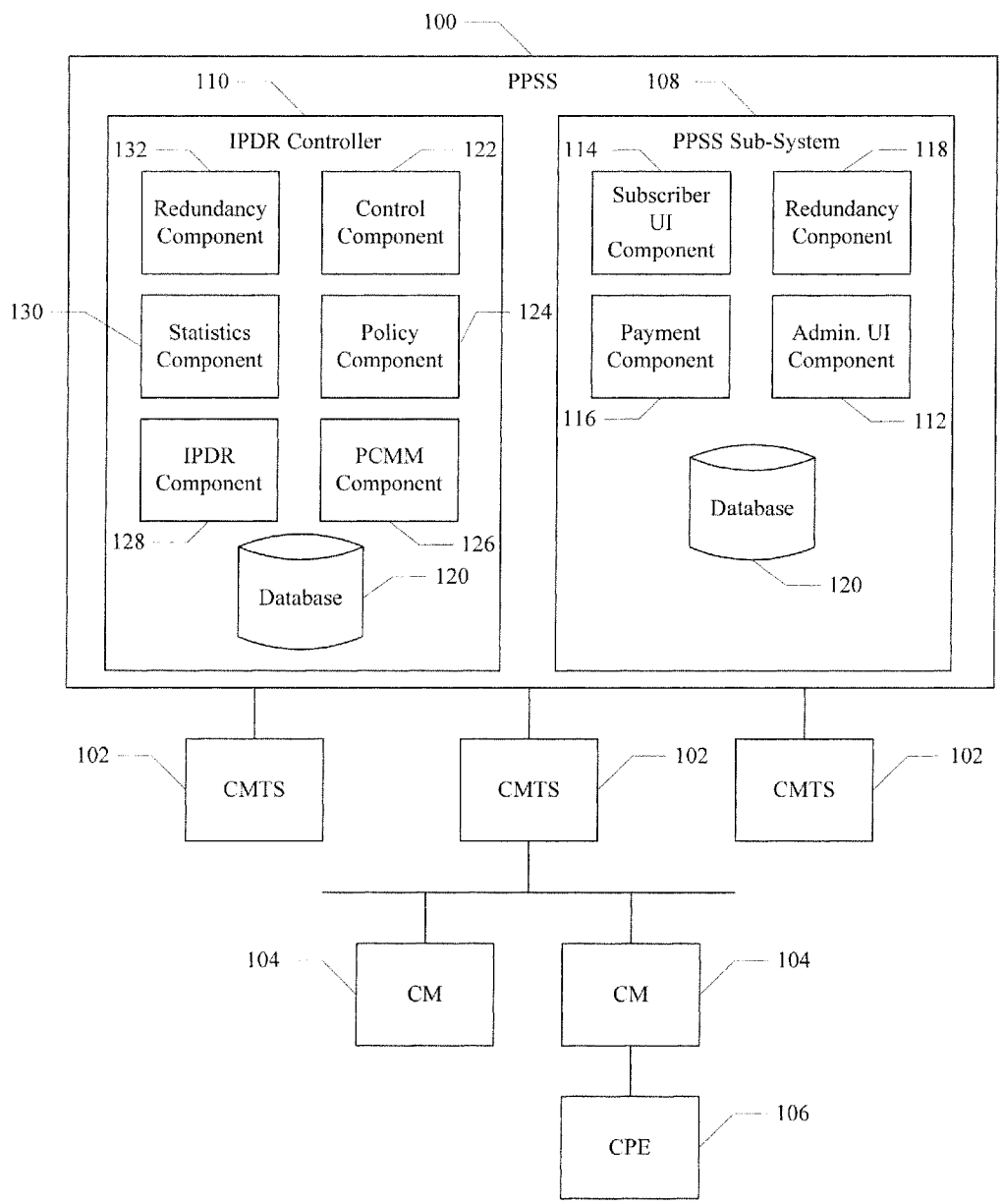
FIG. 1 illustrates a system architecture for implementing a service payment and activation system and method.

A system architecture for implementing the service payment and activation systems, methods, and apparatuses according to an illustrative embodiment is described with reference to FIG. 1. As illustrated, the system includes a pre-paid service system (PPSS) 100. In an illustrative embodiment, the PPSS 100 is a computer, computer system, and/or network of computer systems having one or more databases and other storage apparatuses, servers, and additional components, such as processors or microprocessors, modems, routers, terminals and displays, non-transitory computer-readable media, algorithms, software, modules, platforms, and/or other computer-related components.

In an illustrative embodiment, the PPSS 100 provides a pre-paid service (PPS). In general, the PPSS 100 provides a solution to providing PPS in an Operator's network, such as a communication or media network. The PPSS 100 may provide an administrator interface configured to allow an administrator to control the PPSS 100, and/or a subscriber interface which provides a control interface for Subscribers. For example, the PPSS 100 allows a Subscriber to choose a service level, enter payment information, make on-line payment transactions, and perform other similar functions. The PPSS 100 may collect Internet Protocol Detail Record (IPDR) data, which may include information about a Subscriber's usage on the network, and measure the service usage of a Subscriber. The PPSS 100 may also activate or deactivate a Subscriber's service based on the Subscriber's payment and service level, for example a time limit and/or amount of usage.

In the illustrative embodiment, the PPSS 100 may be deployed in and/or integrated with communication and media services and/or products, such as a cable Operator's network. In an illustrative embodiment, the PPSS 100 may be designed for use in a Data Over Cable Service Interface Specification (DOCSIS) cable network, or other network of the type. The DOCSIS generally includes a set of standards that define transfer of data over an existing cable television system. One example of such standards are defined and maintained by Cable Television Laboratories, Inc. of Louisville, Colo.

In an illustrative embodiment, the PPSS 100 may be in communication with other systems in the network including, but not limited to, one or more Cable Modem Termination Systems (CMTSs) 102. The PPSS 100 may communicate with the systems in the network, including the CMTSs 102 using Transmission Control Protocol/Internet Protocol (TCP/IP) or Internet Protocol Suite.

In an illustrative embodiment, the CMTS(s) 102 may be in communication with one or more Cable Modems (CMs) 104, which may be in communication with one or more Customer Premise Equipment (CPE) devices 106, such as, but not limited to, computers, televisions, smart phones, set top boxes, digital video recorders, routers including wireless routers, and/or other equipment of the type. The CMTS(s) 102 may include a router that provides a physical, data link and network layer connectivity to one or more of the CM(s) 104 in the network. For example, each CMTS 102 in a cable network may be configured to provide cable data service to one or more CM(s) 104. In an illustrative embodiment, the CM(s) 104 is a device at a Subscriber's premise that provides attachment to the cable network. Each CM 104 may be configured to provide cable data service to the Subscriber. In an illustrative embodiment, the one or more CPE devices 106 may be connected to or in communication with the CM(s) 104.

In an illustrative embodiment, each CMTS 102 may be configured to export IPDR data to the PPSS 100. The IPDR data may include information about a Subscriber's usage on the DOCSIS cable network. The CMTS(s) 102 typically exports IPDR data at a configured frequency, such as, but not limited to, every 5 minutes, 15 minutes, and other frequencies. The IPDR data may consist of a flow record for each flow that exists on one or more of the CMs 104 attached to the CMTS(s) 102. In a DOCSIS network, a flow generally provides a provisioned Quality of Service (QoS) for all or a subset of data traffic. Each flow typically includes one direction of data flow, for example either downstream, such as for example, to the CM(s) 104, or upstream, such as for example, from the CM(s) 104. In an illustrative embodiment, each flow record may contain statistics (for example, counters) for the flow including the number of bytes transferred in one or more directions.

In an illustrative embodiment, an Operator may provision each CM 104 that is configured to use the pre-paid service method or PPSS 100 with a default configuration that forces all Hypertext Transfer Protocol (HTTP) traffic to be routed to the PPSS 100. This default configuration may ensure that the Subscriber interacts with the subscriber interface when no service has been paid for. In an illustrative embodiment, this interaction uses standard HTTP and associated protocols. It should be appreciated that the Operator may use CM provisioning tools to effect this configuration.

In an illustrative embodiment, the PPSS 100 may include a PPSS sub-system 108 and an IPDR collector or controller 110. The PPSS sub-system 108 may be configured to provide administrator and subscriber interfaces to the PPSS 100. In an illustrative embodiment, the PPSS sub-system 108 is configured to provide an operator management interface or administrator interface configured to control the PPSS 100, and a subscriber interface which provides a control interface for the Subscribers. For example, the subscriber interface allows the Subscribers to choose a service level, enter payment information, make on-line payment transactions, and perform other similar functions. The subscriber interface may also interact with the IPDR controller 110 to activate and/or deactivate service.

In an illustrative embodiment, the PPSS sub-system 108 may include one or more components, such as, but not limited to an administrator (Admin.) or operator UI component 112, a subscriber user interface (UI) component 114, a payment component 116, a redundancy component 118, and one or more databases 120. The Admin. UI component 112 of the PPSS sub-system 108 may provide an interface for an Operator to configure the service levels that may be presented to the Subscriber. The configured service levels can be stored in the database(s) 120. The Admin. UI component 112 may also include, but is not limited to, other configuration, monitoring and maintenance interfaces that the Operator may use to maintain the PPSS 100 and/or the components of the PPSS 100.

In an illustrative embodiment, the Admin. UI component 112 includes a designer or operator interface and provides one or more web pages to an Operator that allow the Operator to customize the PPSS 100. The Admin. UI component 112 allows the Operator to define a set of service level offerings and associated parameters. The set of service level offerings and associated parameters are typically stored in the database(s) 120. Each service level that is defined and therefore becomes available for the Subscriber to select may include a set of parameters that are visible to the Subscriber and a set that are for internal use in service activation. The Subscriber-visible parameter set may include, but is not limited to, a maximum bit rate for each of a downstream direction and an upstream direction, a maximum burst rate for each of the downstream and upstream directions, capacity limits for each of the downstream and upstream directions, a time limit for service, and/or other similar service levels. The set of internal parameters may include, but is not limited to, traffic profile definitions (for example, parameters as defined in PKT-SP-MM-I05-091029), packet classification parameters (for example, parameters as defined in PKT-SP-MM-I05-091029), and/or other parameters. The Admin. UI component 112 may also allow the Operator to define file pathnames for customized page elements such as, but not limited to, a company logo for customizing the subscriber interface to the Operator's environment.

The subscriber UI component 114 may provide a subscriber interface to a Subscriber that allows the Subscriber to choose or subscribe to a service level, such as, but not limited to a time limit for service and/or a capacity limit (for example a maximum bit rate or burst rate), enter payment information, make on-line payment transactions, and perform other similar functions. The subscriber UI component 114 may also provide a monitoring interface that allows the Subscriber to view the current or historical status of the Subscriber's service. The subscriber UI component 114 communicates with one or more of the other components in the PPSS 100 when the PPSS 100 activates and deactivates the Subscriber's service.

In an illustrative embodiment, the subscriber UI component 114 may provide a subscriber interface, that provides one or more web pages, which may be customized by the Operator as described above. The web pages may provide features to the subscriber, such as but not limited to, service level selection from the set defined by the Operator, storage of Subscriber transaction details in the database(s) 120, payment entry and validation, and other similar features. The storage of Subscriber transaction details may include storing the service details, for example, the service level, and other parameters so that service can be restored if there is a failure. The database(s) 120 may include a subscriber table including the information for extracting a subscriber history and periodic statements for both Subscribers and Operators.

The payment component 116 may be configured to send requests to and receive requests from the subscriber UI component 114 to process a payment in response to the Subscriber choosing a service level. The payment component 116 may interact with on-line payment processing systems such as, but not limited to, credit and/or debit card processing systems to effect a payment for the service. In an illustrative embodiment, the payment component 116 provides an Application Programming Interface (API) which may be invoked by the subscriber interface to make a payment transaction with an external payment processor. The payment component 116 may also record the state of the transaction in the subscriber table in the database(s) 120, including failed transactions.

The IPDR controller 110 may be a system configured to collect IPDR data from one or more CMTSs 102 and may include components configured to activate and/or deactivate a service. In an illustrative embodiment, the IPDR controller 110 measures service usage of a Subscriber, for example an end-user of a cable network service, and may activate or deactivate that service through interaction with the CMTS(s) 102 in the Operator's network.

In an illustrative embodiment, the IPDR controller 110 may include one or more components, such as, but not limited to a control component 122, a policy component 124, a Packet Cable Multi-Media (PCMM) component 126, an IPDR component 128, a statistics component 130, a redundancy component 132, and one or more databases 120. The control component 122 may be configured to send requests to and receive requests from the subscriber UI component 114 and/or the payment component 116 to activate a service level for a Subscriber's CM 104. The control component 122 may also send requests to and receive requests from the policy component 124 to make the activation. In an illustrative embodiment, the control component 122 includes a Web service API. The subscriber UI component 114 uses the Web service API to the control component 122 to allow a Subscriber to make service changes and to extract data about a service, via the subscriber interface. For example, the subscriber UI component 114 uses the Web service API to the control component 122 to allow a Subscriber, via the subscriber interface, to request a pre-paid service or start a new pre-paid service, extend a pre-paid service, cancel a pre-paid service, and/or obtain a status of an existing pre-paid service.

The policy component 124 may be configured to send requests to and receive requests from the control component 122, the PCMM component 126, and/or the statistics component 130 to activate or deactivate a service. In an illustrative embodiment, the policy component may include a database table that stores active service details, such as but not limited to, a cmmacaddress, a cpeipaddress, service level details, and other details of the type. In an illustrative embodiment, the cmmacaddress is the MAC Address of a CM 104 and may be used as the primary identifier of the CM 104. In an illustrative embodiment, the cpeipaddress is the Internet Protocol (IP) Address of a CPE 106. The cpeipaddress may be allocated through Dynamic Host Configuration Protocol (DHCP) when a CM 104 registers with the cable network, and is generally the last known cpeipaddress in effect for a Subscriber. The service level details may include, but are not limited to downstream and upstream service byte limits, a time limit, a service start time, and/or a service traffic profile.

The PCMM component 126 interoperates with and is configured to send requests to the CMTS(s) 102 to activate or deactivate a service. PCMM is generally a standard in the DOCSIS set of standards that defines dynamic creation and deletion of gates to control the Quality of Service (QoS) for service through a CM. A gate is generally a QoS level and packet classification combination which may be dynamically created to control the QoS for all or a subset of traffic to or from a CM. The state of the gates may be stored in the database(s) 120 and/or in-memory.

The IPDR component 128 is configured to receive the IPDR data, for example from the CMTS(s) 102, and save the IPDR data in the database(s) 120 and/or send the IPDR data to the statistics component 130.

The statistics component 130 is configured to receive the IPDR data from the IPDR component 128 and may calculate or compute accumulated usage data, for example, bytes transferred in downstream and/or upstream directions, for each CM 104. In an illustrative embodiment, the statistics component 130 may compute and maintain the usage byte counts for the downstream and upstream directions. As each CMTS 102 export interval delivers updated service flow counters, the statistics component 130 updates the accumulated counters for each direction for each Subscriber device and/or CM. This data can be maintained in-memory and/or in the database(s) 120.

The statistics component 130 may also maintain an in-memory DOCSIS topology database, and store the IPDR data and changes to the IPDR data in the database(s) 120. The topology database may be derived from the data included in the IPDR records. In an illustrative embodiment, the topology database may contain the physical attachment details for which CM 104 a CPE 106 is attached to; and/or which CMTS 102 and CMTS interface a CM 104 is attached to. For example, the topology database may contain details of which cmmacaddess a cpeipaddress is associated with. This data may support determining which CM 104 a cpeipaddress is attached to when the PPSS sub-system 108 invokes the control component 122 API, since the PPSS sub-system 108 knows the cpeipaddress from the source IP address of the HTTP connection being used by the Subscriber to access the subscriber UI component. The data may also support determining to which CMTS 102 to communicate gate actions for the Subscriber's CM 104.

Figure 2:
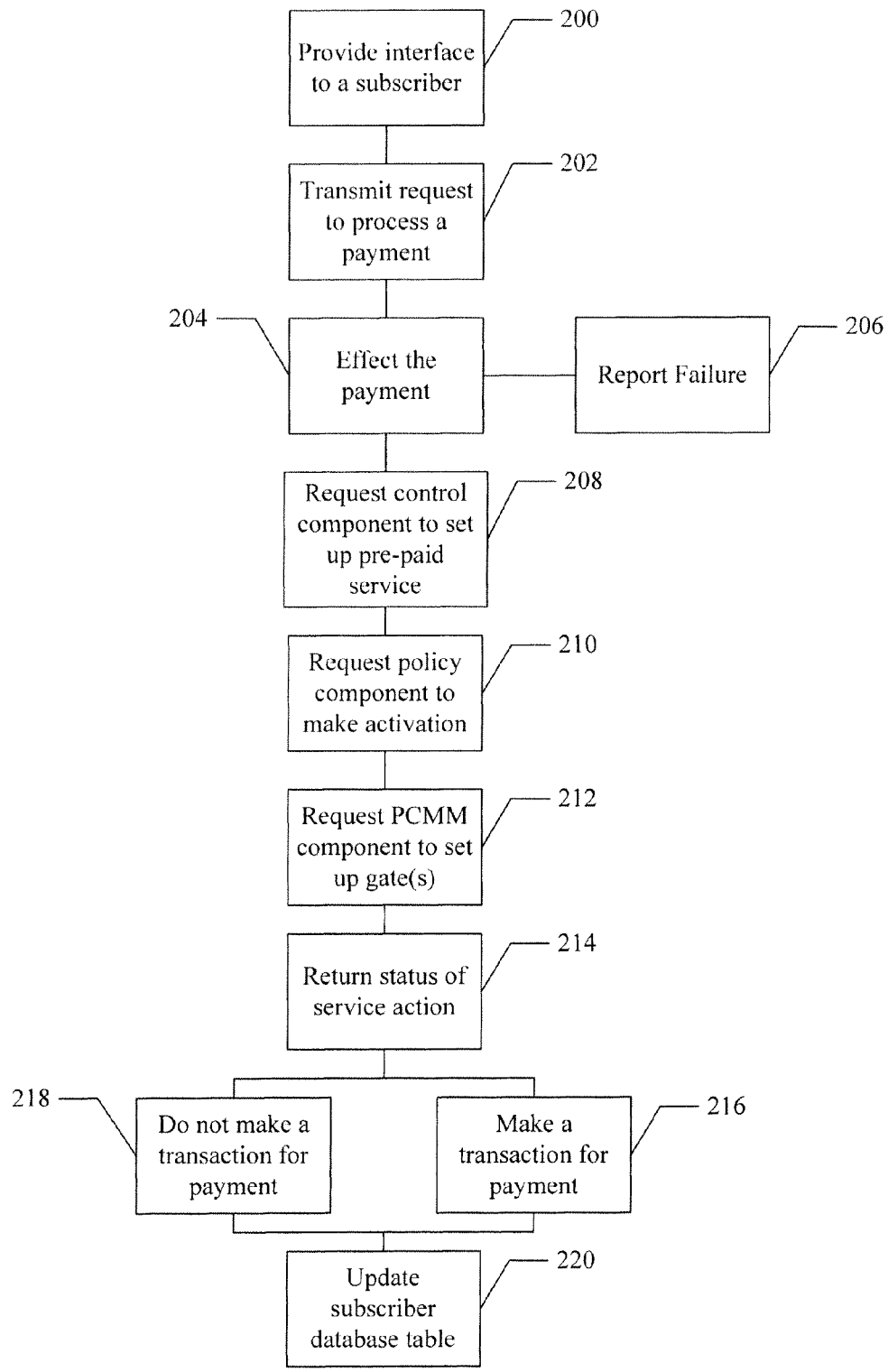
FIG. 2 illustrates a block flow diagram of a method for implementing the service payment and activation system.

A block flow diagram of a method for implementing the PPSS 100 according to an illustrative embodiment is described with reference to FIGS. 1 and 2. In an illustrative embodiment, the subscriber UI component 114 provides a Subscriber access to a subscriber interface, for example via a subscriber device, illustrated as block 200. The subscriber device may be a device such as but not limited to, a computer, personal digital assistant (PDA), cellular or mobile phone, and other devices that can access, provide, transmit, receive, and modify information over wired or wireless networks such as the Internet. The subscriber interface allows the Subscriber to select a service level and enter payment information. In response to the Subscriber selecting the service level and entering the payment information, the subscriber UI component 114 may transmit a request to the payment component 116 to process a payment, illustrated as block 202. To process the payment the payment component 116 may interact with an on-line payment processing system, for example via an API, to effect the payment for the service, illustrated as block 204. If the payment request fails, the subscriber UI component 114 reports the failure to the Subscriber via the subscriber interface, illustrated as block 206.

If the payment is authorized, the subscriber UI component 114 may make a request to the control component 122 in the IPDR controller 110 to provide service to the CM 104 for the Subscriber, illustrated as block 208. In an illustrative embodiment, the subscriber UI component 114 requests a Pre-Paid Service (PPS) service setup or activation by invoking the web service API to the control component 122 and sending a request to activate a service level for the Subscriber's CM 104. In an illustrative embodiment, the request to set-up a new Pre-Paid Service (PPS) may include the transmission of input parameters to the control component 122. The input parameters may include, but are not limited to, a cpeipaddress, and other service parameters, for example, downstream and upstream byte limits, a time limit, and/or other similar parameters. The cpeipaddress may be derived from the source IP Address of the HTTP connection from a Subscriber device to the PPSS sub-system 108. For API calls where the Subscriber is identified by cpeipaddress, the control component 122 may also request the corresponding cmmacaddress for the cpeipaddress from the statistics component 130 which contains the topology database containing such information, as described above.

Upon receiving the request to activate the service level for the Subscriber's CM 104, the control component 122 requests the policy component 124 to make the activation, illustrated as block 210. Upon receiving the request, the policy component 124 in turn may request the PCMM component 126 to request the CMTS 102, to which the Subscriber's CM 104 is attached, to set one or more PCMM gates, for example, at least one for each direction, which activates the service, illustrated as block 212. The interaction between the PCMM component 126 and the CMTS 102 may use, for example a standard Common Open Policy Service (COPS) based protocol messaging defined in the DOCSIS standard (PKT-SP-MM-I05-091029). The one or more gate sets for service activation may be used by the CMTS 102 and CM 104 to classify traffic to and from the CPE 106, for example as defined by the DOCSIS standards, such that the traffic receives the service level defined QoS and may also permit all traffic to be routed generally between the CPE 106 and the Internet.

In an illustrative embodiment, the PCMM component 126 performs a Gate Set function on behalf of the Policy component to set the PCMM gate(s). The Gate Set function creates one or more new gates on the CMTS 102 for the specific Subscriber's CM 104, which specifies the service level and/or the QoS to apply to traffic for the Subscriber's CM 104 corresponding to the service level of the pre-paid service that the Subscriber has paid for. The activation may also be invoked through Administrator action independent of Subscriber payment to allow for the Administrator to override the PPSS 100 for any reason.

In an illustrative embodiment, the control component 122 returns or outputs the status of the service activation attempt to the subscriber UI component 114, illustrated as block 214. The output may include, but is not limited to, success or failure. If the output is a failure, the control component 122 may also output details of the reason(s) of the failure. If the service activation has succeeded the subscriber UI component 114 requests the payment component 116 to make the transaction commitment for the payment previously authorized, illustrated as block 216. If the service activation fails then the subscriber UI component 114 requests the payment component 116 to cancel the previously authorized payment transaction, illustrated as block 218. In this way the Subscriber may only be charged if the service activation is successful and the service is only activated if the payment is authorized. The payment component 116 either cancels or commits the previously authorized transaction through the API to the external payment processing system.

The subscriber UI component 114 then updates the subscriber database table with the transaction and service status for the Subscriber and responds back to the subscriber interface with the status, illustrated as block 220. The subscriber interface allows the Subscriber to enter an address, such as an email address, for receipt of statements. The transaction status can be mailed and/or sent to the Subscriber as a receipt.

Figure 3:
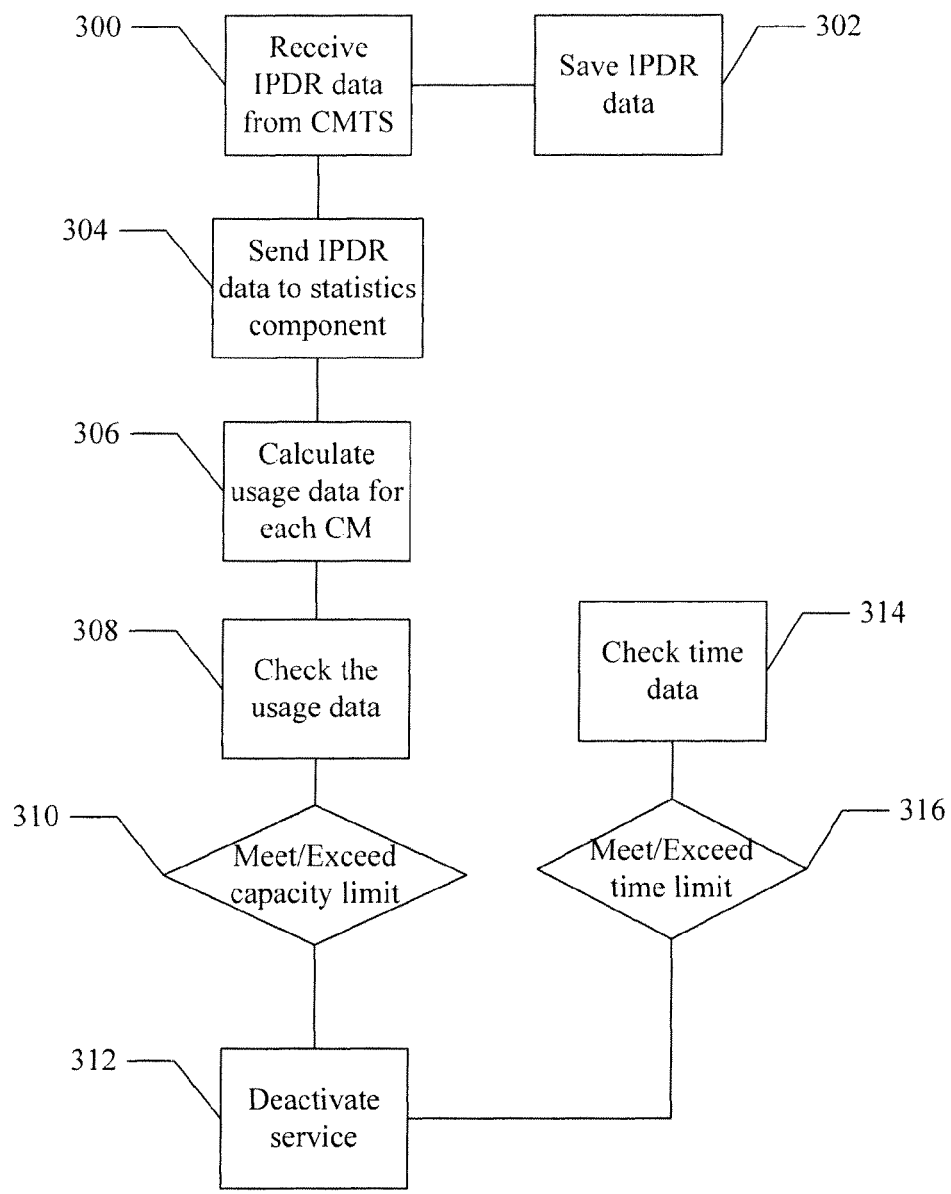
FIG. 3 illustrates a block flow diagram of a method for monitoring an activated service and deactivating the service.

A block flow diagram of a method for monitoring an activated service and deactivating the service according to an illustrative embodiment is described with reference to FIGS. 1 and 3. In an illustrative embodiment, a purchased service level may define a capacity limit for one or both of downstream and upstream directions. The purchased service level may define a time limit for the service. Alternatively, the purchased service level may define both a capacity limit and a time limit such that service can be terminated when the capacity limits and/or the time limits have been reached.

Each CMTS 102 may export IPDR data to the IPDR controller 110 periodically, for example in accordance with the DOCSIS standard (CM-SP-OSSIv2.0-I10-070803). The IPDR data includes statistics, for example counters, associated with each flow active on each CM 104. The IPDR component 128 may receive the IPDR data from the CMTS(s) 102, illustrated as block 300. Upon receiving the IPDR data, the IPDR component 128 may save the IPDR data in the database(s) 120, illustrated as block 302, and/or pass the IPDR data to the statistics component 130, illustrated as block 304. Upon receiving the IPDR data, the statistics component 130 may calculate the accumulated usage data for each CM 104, illustrated as block 306. In an illustrative embodiment, the statistics component 130 may calculate the amount of bytes transferred in the downstream and/or the upstream directions.

For Subscribers using the PPS, the accumulation or amount of bytes transferred to or from a Subscriber's CM 104 starts when the service is activated so that the accumulated counters for the CM 104 correspond to the actual capacity used in each of the downstream and/or upstream directions for the duration of the service activation.

The policy component 124 may communicate with the statistics component 130 and check the accumulated statistics calculated by the statistics component 130 to determine whether a Subscriber or the Subscriber's CM 104 has met or exceeded the capacity limit for the service activation in one or both of the downstream and upstream directions, illustrated as block 308. It should be appreciated by one skilled in the art that this check may only be performed if the activated service level specified a capacity limit.

In the case where the activated service level specified at least a capacity limit, and the policy component 124 determines that a Subscriber or the Subscriber's CM 104 has met or exceeded the service level capacity limit for an activated service, illustrated as block 310, the policy component 124 may request the PCMM component 126 to deactivate the service for the Subscriber's CM 104, illustrated as block 312. The PCMM component 126 may perform the service deactivation using standard PCMM COPS messages to delete the one or more gates corresponding to the activated service, for example as defined by the DOCSIS standard (PKT-SP-MM-I05-091029).

In an illustrative embodiment, the PCMM component 126 performs a Gate Delete function on behalf of the Policy component to deactivate the service for the Subscriber's CM 104. The Gate Delete function deletes one or more existing gates on the CMTS 102 for a specific Subscriber's CM 104. The deactivation may also be invoked through Administrator action independent of Subscriber payment to allow for the Administrator to override the PPSS 100 for any reason.

In the case where the activated service level specified at least a time limit, the policy component 124 checks to determine whether the Subscriber or the Subscriber's CM 104 has met or exceeded the service level time limit, illustrated as block 314. If the Subscriber or the Subscriber's CM 104 has met or exceeded the service level time limit for an activated service, illustrated as block 316, the policy component 124 may request the PCMM component 126 to deactivate the service for the Subscriber's CM 104, as described above, illustrated as block 312.

In an illustrative embodiment, the PCMM component 126 may also perform a Gate Sync procedure with a CMTS 102 whenever a new connection, for example a COPS connection, is created to that CMTS 102. Once a connection has been created to a CMTS 102 the connection is maintained until there is a failure. When a new connection is created it is possible that the state of the gates on the CMTS 102 may differ from the desired states kept by the PPSS 100. For example, a connection loss may cause loss of one or more gate actions, and/or the CMTS 102 may have restarted in which case all gates that were active may be lost. To avoid the possibility that a Subscriber has paid for service but the CMTS 102 has lost the gate states that would enable the service, the PCMM component 126 may use the Gate Sync to check which gates the CMTS 102 has active. The PCMM component 126 may then compare active gates with the expected gate states that the PCMM component 126 has stored in the database(s) 120 and/or in-memory. If the CMTS 102 is missing gates that it should have, the PCMM component 126 may perform one or more Gate Set actions as described above for each missing gate. If, on the other hand, the CMTS 102 has gates that the PCMM component 126 does not expect the CMTS 102 to have, the PCMM component 126 may perform one or more Gate Delete actions to remove those gates, as described below. In this way the PCMM component 126 forces the CMTS 102 to conform to the same gate states as the PCMM component 126.

In an illustrative embodiment, the subscriber UI component 114 may provide payment validation though the payment component 116 API to an external payment system, and display back to the Subscriber the status of the payment. The subscriber UI component 114 may also store any failed transactions in the database(s) 120 or in-memory. In an example, if the Subscriber attempt fails the subscriber UI component 114 may store the failure details, including for example, payment failures, activation failures, and/or other failures and parameters.

In an illustrative embodiment, the subscriber UI component 114 may also provide a subscriber interface that allows the Subscriber to extend an existing service activation and/or change the service level or other parameters of the existing service activation by making a further payment transaction. This allows continuation of service without interruption. In this embodiment, the subscriber UI component 114 may request the appropriate change of the control component 122.

In an illustrative embodiment, the subscriber UI component 114 requests an extension of service and/or change to the service level by invoking the web service API to the control component 122 and sending a request to the control component 122. In an illustrative embodiment, the request may include the transmission of input parameters to the control component 122. The input parameters may include, but are not limited to, a cpeipaddress, cmmacaddress, and other service parameters, for example, downstream and upstream byte limits, a time limit, and/or other similar parameters. If there is no existing service, the control component 122 treats the request as a PPS service setup or activation request, described above.

If the service activation is to be extended the control component 122 may adjust the parameters, for example, quota/capacity limits and/or time limits, of the service activation in the database(s) 120 for the Subscriber. Generally, no additional interaction with the CMTS 102 is required. If the service level is being changed where the new service level has a different QoS compared to the existing service activation, the control component 122 may create one or more new gates, for example, one for each direction, for the new service level through the policy component 124 and PCMM component 126 which in turn may request the new gates to be set up by the CMTS 102. On receiving notification that the new Gates have been set, the control component 122 may request that the previous gates for the previous service level be deleted, again using the policy component 124 and PCMM component 126 and making that request to the CMTS 102. The control component 122 may also return or output the status of the extension of service and/or change to the service level request to the subscriber UI component 114. The output may include, but is not limited to, success or failure. If the output is a failure, the control component 122 may also output details of the reason(s) of the failure.

In an illustrative embodiment, the Admin. UI component 112 may also include a reporting component which can create periodic reports of Subscriber service changes including the transaction payments. These reports may allow summarized accounts to be produced and where appropriate may allow splitting of the revenue between one or more vendors that together offer the Pre-Paid Service (PPS). These reports may use the data stored in the database(s) 120 as the source data for report generation.

In an illustrative embodiment, the subscriber UI component 114 and/or the Admin. UI component 112 may provide a service status function. When performing the service status function, the subscriber UI component 114 and/or the Admin. UI component 112 may request the PCMM component 126 to perform a Get Info function, for example via the control component 122. The Get Info function requests information from a CMTS 102 about a specific gate on a specific Subscriber's CM 104.

In an illustrative embodiment, the subscriber UI component 114 and/or the Admin. UI component 112 requests the service status by invoking the web service API to the control component 122 and sending a request to the control component 122. In an illustrative embodiment, the request may include the transmission of input parameters to the control component 122. The input parameters may include, but are not limited to, a cpeipaddress, cmmacaddress, verifycmts, and other service parameters, for example, downstream and upstream byte limits, a time limit, and/or other similar parameters. If the verifycmts, or CMTS is verified, the control component 122 may also verify the gate(s) on the CMTS. The control component 122 may also return or output the status of the service to the subscriber UI component 114 and/or the Admin. UI component 112. The output may include, but is not limited to, success or failure. If the output is a failure, the control component 122 may also output details of the reason(s) of the failure. If the output is a success, the control component 122 may also output details of the subscriber state and/or status of the service.

The service status function may be invoked through Administrator or Operator action, via the Admin. UI component 112, to check the state of a Subscriber's service, and/or the service status function may be invoked by a Subscriber through the subscriber UI component 114 to support presentation of service state to the Subscriber. This allows the Subscriber or Operator to obtain the details of current service, for example, service level details, remaining time, capacity used/remaining and/or recent usage by time.

In an illustrative embodiment, the subscriber UI component 114 and/or the Admin. UI component 112 may provide a cancellation function. When performing the service cancellation function, the subscriber UI component 114 and/or the Admin. UI component 112 may request the PCMM component 126 to deactivate a Subscriber's service as described above, for example via the control component 122.

In an illustrative embodiment, the subscriber UI component 114 and/or the Admin. UI component 112 requests service cancellation by invoking the web service API to the control component 122 and sending a request to the control component 122. In an illustrative embodiment, the request may include the transmission of input parameters to the control component 122. The input parameters may include, but are not limited to, a cpeipaddress, cmmacaddress, and other service parameters, for example, downstream and upstream byte limits, a time limit, and/or other similar parameters. The control component 122 may also return or output the status of the service to the subscriber UI component 114 and/or the Admin. UI component 112. The output may include, but is not limited to, success or failure. If the output is a failure, the control component 122 may also output details of the reason(s) of the failure. The service cancellation function may be invoked through Administrator or Operator action, via the Admin. UI component 112, and/or a Subscriber through the subscriber UI component 114 to cancel a Subscriber's service. This allows the Subscriber or Operator to cancel service at any time.

In an illustrative embodiment, the subscriber UI component 114 may also provide a subscription service to a Subscriber. This variant of service automates the pre-payment for an Operator-defined service on a periodic or usage threshold basis. If the Subscriber chooses the subscription option, the PPSS sub-system 108 automatically attempts to extend the service at a configured threshold before the current service payment would expire. For a time-limit service, the threshold may be a time delta before the service expiry time. For a capacity limit the threshold may be a usage, for example, a byte count, delta before the service limit.

In an illustrative embodiment, two separate server or computer systems can be deployed to form a redundant cluster so that failure of one server does not cause loss of service. In this embodiment, each server may run an additional redundancy component, for example one or more of redundancy components 118 and 132, which is responsible for electing one of the servers to be a primary server with the other being a backup, and for controlling replication of data from the primary to the backup so that the backup has all the data to take over as the primary server. This component, for example one or more of redundancy components 118 and 132, may include a protocol exchanged between the servers which can detect when a server becomes unreachable. If the primary server becomes unreachable then the backup will be elected primary and will take over that role.

In an illustrative embodiment, the PPSS sub-system may be placed on the same server or computer system as the IPDR controller, or a separate server system from the IPDR controller. Further, a single PPSS sub-system can manage multiple IPDR controllers. In another illustrative embodiment, a plurality of PPSS sub-systems can be deployed in a large Operator's network to provide sufficient scaling to handle the expected transaction load from Subscriber interactions. In this embodiment, a separate master PPSS sub-system can be deployed as the single point of contact for Administrator and Subscriber interactions. The master PPSS sub-system may pass requests to the appropriate PPSS sub-system for processing based on topological knowledge learned from the IPDR controller systems. Further, a single master system may be deployed to oversee the plurality of PPSS sub-systems.

While the systems, methods, and apparatuses have been described and illustrated in connection with certain embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure.

What is claimed is:

1. A system comprising:
    at least one pre-paid service system on one or more servers, said at least one pre-paid service system comprising:
        a user interface component, said user interface component configured to:
            receive a request to activate a service, said request including a service level selection defining at least one of a data capacity limit and a time limit;
            send a first request for processing of a payment for said service, said processing including interacting with an online payment processing component for authorizing said payment;
            receive an authorization for said payment or a payment failure in response to said first request;
            send a second request to activate said service in response to receiving said authorization;
    at least one cable modem termination system (CMTS) in communication with and configured to receive requests from said at least one pre-pre-paid service system; and
    at least one cable modem in communication with said at least one CMTS, said at least one CMTS configured to provide data service to said at least one cable modem,
    wherein said at least one pre-paid service system includes at least one Packet Cable Multi-Media (PCMM) component configured to communicate with said at least one CMTS to set up said at least one gate on said at least one CMTS in response to said second request to activate said service, and wherein said user interface component is further configured to send a third request for commitment of said previously authorized payment in response to activation of said service.

2. The system of claim 1, wherein said user interface component is part of at least one pre-paid service sub-system of said at least one pre-paid service system and configured to receive said service level selection from a subscriber.

3. The system of claim 1, wherein said at least one pre-paid service system includes at least one payment component configured to perform said processing of said payment.

4. The system of claim 3, wherein said at least one payment component is configured to cancel said previously authorized payment in response to said activation of said service failing.

5. The system of claim 1, wherein said at least one pre-paid service system includes at least one statistics component configured to calculate usage data for said at least one modem.

6. The system of claim 5, wherein said at least one pre-paid service system includes at least one policy component configured to determine when a subscriber meets or exceeds said data capacity limit or said time limit.

7. The system of claim 6, wherein said at least one policy component is configured to request said at least one PCMM to deactivate said service when said subscriber has met or exceeded said data capacity limit or said time limit.

8. The system of claim 1, wherein said PCMM component is configured to communicate with said at least one CMTS to delete said at least one gate on said at least one CMTS when said data capacity limit or said time limit is met or exceeded.

9. The system of claim 1, wherein said at least one PCMM component is configured to communicate with said at least one CMTS and set up said at least one gate in each direction on said at least one CMTS.

* * * * *